(12) United States Patent
Burlage et al.

(10) Patent No.: US 6,612,555 B2
(45) Date of Patent: Sep. 2, 2003

(54) ELASTOMERIC BEARING UNIT FOR ASSEMBLIES OR CHASSIS PARTS OF VEHICLES

(75) Inventors: Thomas Burlage, Wallenhorst (DE); Martin Hoerauf, Stemshorn (DE); Frank Friedrich, Lemförde (DE); Jan Wucherpfennig, Brockum (DE)

(73) Assignee: BASF Atiengesellschaft, Ludwigshafen (DE)

(*) Notice: Subject to any disclaimer, the term of this patent is extended or adjusted under 35 U.S.C. 154(b) by 0 days.

(21) Appl. No.: 09/855,970

(22) Filed: May 15, 2001

(65) Prior Publication Data

US 2001/0042950 A1 Nov. 22, 2001

(30) Foreign Application Priority Data

May 18, 2000 (DE) .......................... 100 24 616

(51) Int. Cl.⁷ ................................. F16K 7/10
(52) U.S. Cl. .................. 267/140.3; 267/141; 267/153
(58) Field of Search .................... 267/140.3, 141.1, 267/141, 136, 153, 152; 248/636

(56) References Cited

U.S. PATENT DOCUMENTS

| | | | | |
|---|---|---|---|---|
| 2,638,303 A | * | 5/1953 | Pietz | 268/140.3 |
| 2,642,252 A | * | 6/1953 | Pietz | 267/140.3 |
| 2,683,007 A | * | 7/1954 | Iredell | 267/140.3 |
| 2,987,291 A | * | 6/1961 | Dyson | 267/140.3 |
| 3,752,462 A | | 8/1973 | Wight, Jr. | |
| 5,156,380 A | * | 10/1992 | Cerruti et al. | 267/140.3 |
| 5,456,454 A | | 10/1995 | Schulz et al. | |

FOREIGN PATENT DOCUMENTS

| | | |
|---|---|---|
| DE | 2223314 | 11/1972 |
| DE | 2549936 | 5/1977 |
| DE | 4319689 | 12/1994 |

OTHER PUBLICATIONS

Derwent Abstract of DE 2549936.

* cited by examiner

*Primary Examiner*—Matthew C. Graham
(74) *Attorney, Agent, or Firm*—Fernando A. Borrego

(57) ABSTRACT

The invention relates to a bearing unit (1) for receiving add-on parts and vehicle components on supporting parts of vehicles. The bearing unit (1) comprises at least one elastically deformable elastomeric component (3, 13) which is supported on a support (9). The support (9) has received elastomeric spring components (3, 13; 17, 18, 19, 20), not connected to one another.

11 Claims, 3 Drawing Sheets

ELASTOMERIC BEARING UNIT FOR ASSEMBLIES OR CHASSIS PARTS OF VEHICLES

Figure 1:
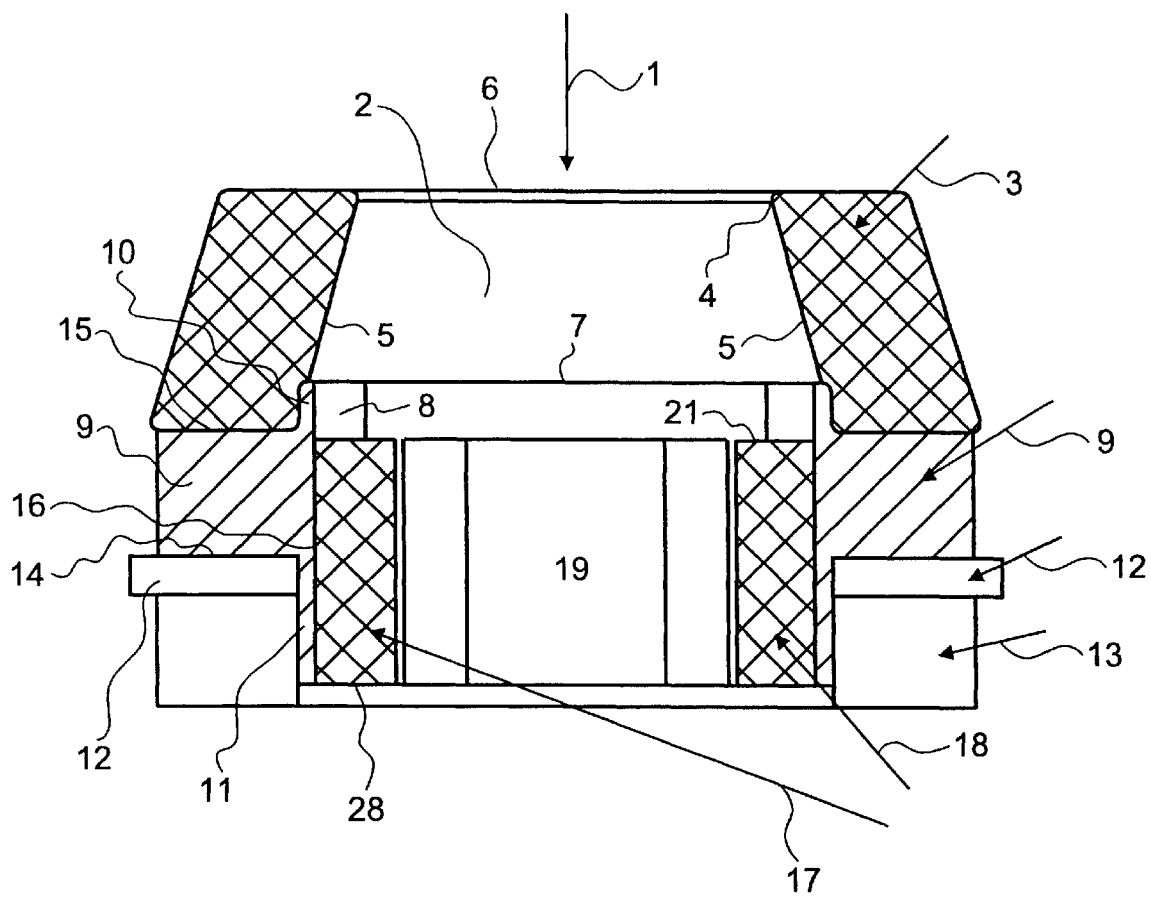

The invention relates to a bearing unit for assemblies or chassis parts of vehicles, in particular to a bearing unit comprising elastomer springs.

Bearing units which comprise elastomeric springs are used as auxiliary frame bearings to receive add-on components or add-on assemblies or chassis parts on the supporting units of a vehicle. Various bearing rigidities are required from the bearing units in order to take account of different extents of freedom of movement and different dynamic properties.

DE 25 49 936 C2 discloses an impact absorber with an elastomeric spring arranged in a rigid casing. The end side of this rigid casing forms one abutment for the elastomeric spring, while the second abutment for the elastomeric spring is formed by a piston capable of movement relative to the rigid casing. The elastomeric spring has a through-opening which runs in the axial direction, and has a cavity formed exclusively by the inside wall of the elastomeric spring and extending over the entire axial length of the elastomeric spring. The design of the elastomeric spring is such that, in every operating condition of the impact absorber, the spring abuts with the entire outer surface on the inner surface of the rigid casing.

DE 2 223 314 relates to a bumper with an elastomeric spring and friction damping. A rigid casing of substantially tubular shape is designed with a widening, the diameter of which is greater than that of the front part of the casing, and which has end faces closed off by virtue of its design. In the front part of the casing there is a piston which can move in the axial direction, the cylindrical elastomeric spring being arranged in the casing axially between the piston and one closed-off end face and having, in the region of the front part of the casing, a substantially uniform external diameter. In order to achieve a radial constraint on the elastomeric spring, this is of a dimension equal to or greater than the internal diameter of the front part of the casing, and the internal diameter of the widening of the casing is dimensioned to allow a limited extent of deformation and kinking of the elastomeric spring.

DE 43 19 689 A1 relates to a support bearing for motor vehicles. The solution proposes a support bearing for vehicles with a progressive spring characteristic. A central supporting rod extends through a receiving opening in a supporting part, for example in the bodywork of a motor vehicle, with radial play. The receiving opening has, surrounding this opening at a distance and securely mounted with respect thereto, cup-shaped receptacles for elastic support elements which—in relation to the plane of the receiving opening—are open toward opposite sides. In an assembled support bearing, the elastic support elements are held and prestressed with respect to one another between the abutments of the support rod, and hold the support rod so that it is axially and angularly movable with respect to the supporting part. In the assembled condition, there is free space radially between the elastic support elements and the walls of the cup-shaped receptacles, and the elastic support elements are firmly set radially with respect to the cup-shaped receptacles, at least substantially with maintenance of the radial free space between these and the cup walls.

In other prior art solutions, elastomeric components for the various directions are connected to one another. Furthermore, in order to achieve varying rigidities, use is made of inserts made from foreign materials which have an adverse effect on the recyclability of bearing units of this type, since an additional operation is required to bring about separation of the materials.

It is an object of the present invention, in the light of the prior art solutions outlined, to provide a bearing unit whose rigidities can be adjusted independently of one another, and which is easy to assemble and to recycle.

We have found that this object is achieved in that a bearing unit for receiving add-on parts and vehicle components on supporting parts of vehicles comprises at least one elastically deformable component which is supported by a support, and the elastomeric spring components received on this support have no connection to one another.

The advantages achievable with this solution are especially seen in that the separation from one another of each of the elastomeric spring components carried and held on the support means that the rigidities of the bearing unit in a vertical direction, and also in a radial direction, can be adjusted entirely freely and independently of one another. This means that the rigidities in all three coordinate directions can be adjusted independently of one another; and this means that the use of inserts of another material in the bearing unit can be dispensed with, since the rigidities can be adjusted in the desired manner by using appropriate elastomeric spring components, for example components with different hardness, on the support. Thus, simply by inserting elastomeric spring components of different hardness around a 360° circle, it is possible to establish different damping characteristics in a radial direction at particular points around the circumference of any particular bearing unit.

In another embodiment of the solution of the invention, the elastomeric spring components have different rigidities which can be brought about, for example, by using different hardnesses for the elements to be inserted or applied. It is, of course, also possible for different hardnesses or rigidities to be achieved through the use of different materials to form the elastomeric spring components.

If the support and the elastomeric spring components are composed of the same base material, such as cellular PU with TPU, the bearing unit of the invention has excellent recyclability, since there is no need to separate different materials within the bearing unit, and the steps required for this purpose in any recycling process can be dispensed with. Alongside excellent recyclability, furthermore, using the same material for support and elastomeric spring components gives good adhesion between the components.

If the support is manufactured from a material other than that used for the elastomeric spring components, for example from a metal core, the elastomeric spring components made from elastomeric material may simply be inserted onto this. Besides inserting the appropriate elastomeric spring components onto the support or into the support, elastomeric spring components may also be bolted, screwed or adhesively bonded to the support.

Another embodiment of the connection of elastomeric spring components to the support unit consists in foaming the elastomeric spring components onto the support unit. If these components are composed of the same base material, the foaming-on requires no adhesion promoter between these components.

To simplify the assembly of a bearing unit according to the invention, the support may be designed with abutment surfaces for the respective elastomeric spring components. Besides this, the support may also be provided with centering devices in the form of centering collars with which, during assembly, the elastomeric spring components to be received onto the support can be placed directly into the correct position, so that no further adjustment procedures are necessary.

For example, in one embodiment radially acting elastomeric spring components can be held by a collar of the support while they are inserted into the interior of the support, and are supported on the surface of its internal circumference, so that the radially acting elastomeric spring components have been received within the support in a manner which allows them to move relative to the same. To allow deformation of the radially acting elastomeric spring components, space is provided between the radially acting elastomeric spring components, and this space serves to receive the deformed material of the respective elastomeric spring component subjected to deformation.

In a preferred method, the support of the bearing unit is received on a frame structure in the region of a supporting part of a vehicle.

The cross section of the opening in the bearing unit proposed according to the invention can be adjusted via the shaping of the radially acting elastomeric spring components. If the radially acting elastomeric spring components have raised regions with a rounded profile, these project into the interior of the bearing unit aperture and, in non-deformed condition, establish a cross section of the opening. Any component which may be introduced into the bearing unit aperture is therefore held and carried by four raised regions of the radially acting elastomeric spring components, these raised regions delimiting the cross section of the opening in the bearing unit.

The invention is described in more detail below using a drawing.

Figure 2:
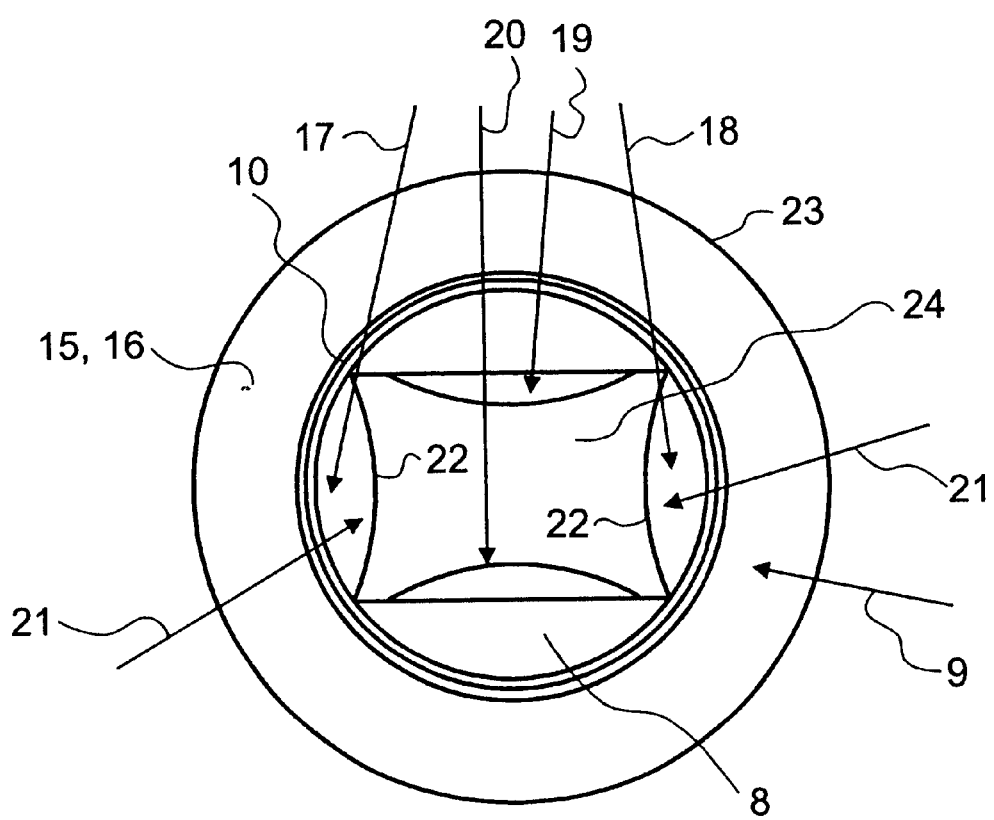
Figure 3A:
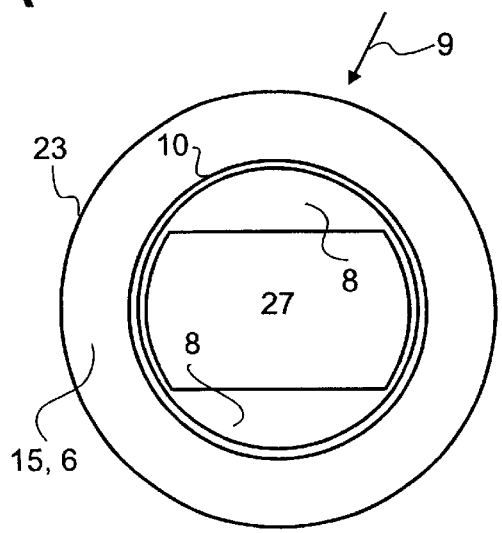
Figure 3B:
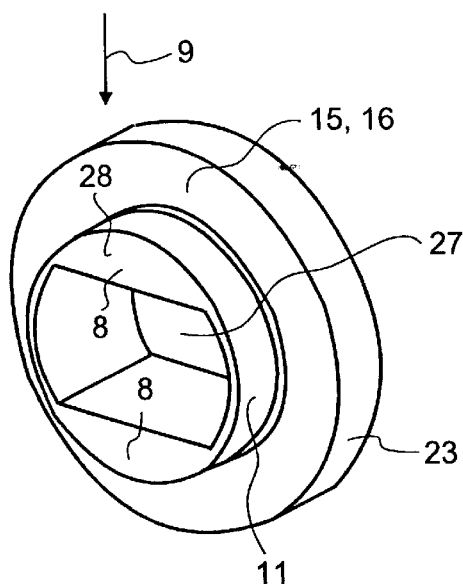
Figure 3C:
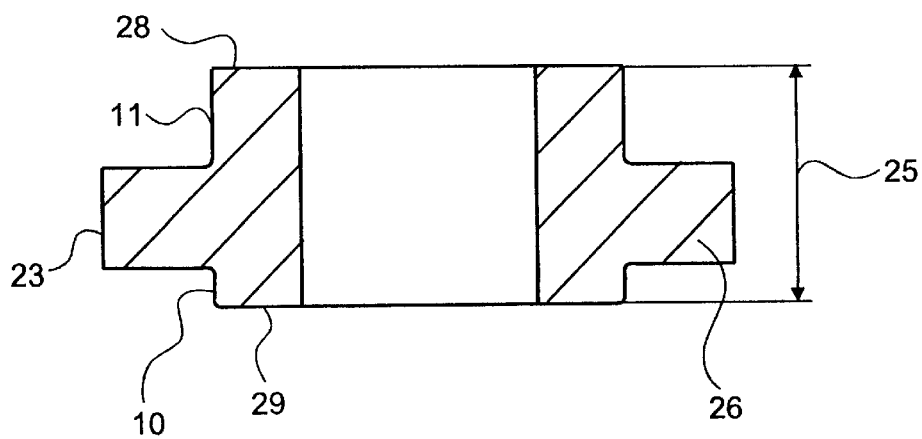

FIG. 1 shows a cross section through a bearing unit proposed according to the invention with an elastomeric spring upper part received on the support and, likewise shown in section, radially acting elastomeric spring components abutting the inside of the support, FIG. 2 shows a plan view of a bearing element with, projecting into the cross section of the opening, raised regions of the radially acting elastomeric spring components, FIG. 3a shows a plan view of the support of the bearing unit proposed according to the invention, FIG. 3b shows a perspective view of the support with molded-on centering collar and annular surfaces on which the elastomeric spring components acting in a vertical direction abut, and FIG. 3c shows a cross section through the support of FIGS. 3a and 3b.

FIG. 1 shows the cross section through the bearing unit proposed according to the invention, which, with its support, has been received onto a frame structure, for example the frame structure of a vehicle.

The bearing unit proposed according to the invention is composed of a support 9, one of whose surfaces has been secured to the frame 12 of a supporting component, for example of a vehicle. The upper side of the support 9 has received an elastomeric spring component 3 which has a substantially annular conical shape and surrounds an opening 2. The upper face side of the elastomeric spring component 3 has been provided with a chamfer 4 whose inner side passes over into the conical, annular inner surface 5 of the elastomeric spring component 3. Since the elastomeric spring component has a conical shape, the diameter 6 of its upper face side is smaller than its diameter 7 below, above a collar 8 molded onto the support 9. The lower side of the annular elastomeric spring component 3 lies on an abutment surface 15 of the support 9. Besides an abutment surface 15 for the elastomeric spring component 3 described, the support 9 has been designed with another abutment surface 14, via which the support 9 has been placed on the frame structure 12. In the interior of the support 9, furthermore, an abutment surface has been provided for the radially acting elastomeric spring components, which are described in more detail below. In addition, the support unit 9 has been provided with two centering devices in the form of centering collars 10 and 11. The upper centering collar 10 is used to center the elastomeric spring component 3 on the abutment surface 15 of the support 9, while the lower centering collar 11 is used to form the abutment surface 16 for the radially acting elastomeric spring components 17, 18, 19 and 20 (not shown here).

The radially acting elastomeric spring components 17, 18, 19 and 20 have been designed with raised regions 21 which stand proud of the collar 8 of the support 9 and narrow the cross section of the through-opening in the bearing unit 1 (cf. illustration in FIG. 2). Placed on the lower side of the frame structure 12 there is a lower elastomeric spring component 13, likewise of annular design, but not shown in greater detail here.

The abovementioned annular elastomeric spring components 3 and, respectively, 13 can be used to set different spring rigidities of the bearing unit 1 in a vertical direction. By simply swapping the elastomeric spring components 3 and 13 abutting the support 9, the rigidity of the bearing unit in a vertical direction can be adjusted independently of the rigidity in a radial direction, which is determined by the rigidities of the radially acting elastomeric spring components 17, 18, 19 and 20.

It can moreover be seen from the illustration in FIG. 1 that the radially acting elastomeric spring components 17, 18, 19 and 20 abutting the inner abutment surface 16 have been arranged with space between them, as indicated by the gaps extending longitudinally between the radially acting elastomeric spring components. The provision of space between the radially acting elastomeric spring components allows these to deform, with space available into which the deforming material can move. To improve the recyclability of the bearing unit proposed according to the invention, the support or the support element 9 and the radially acting elastomeric spring components 3, 13 and 17, 18, 19 and 20 may be produced from the same base material. A particular reason for the increased recyclability of a bearing unit of this nature is that, using the solution proposed according to the invention, the bearing unit is composed entirely of a base material and there is no need to provide the material-separation processing steps which increase recycling costs. In addition, when the bearing unit 1 proposed according to the invention is produced from a support 9 with, received thereon, elastomeric spring components 3 and 13, adhesion of the fit-on elastomeric spring components 3 and 13 to the support material is possible without provision of an adhesion promoter on the abutment surfaces 15 and 16.

Besides the application or introduction of the radially acting elastomeric spring components 17, 18, 19 and 20 into the opening below the collar 8 on the support 9, it is also possible for the elastomeric spring components 3 and 13 which can be applied to be screwed or bolted to the support. The illustration in FIG. 2 gives a plan view of the bearing unit 1 of the invention.

In the interior of the support 9, the bearing unit 1 comprises an opening designed to be substantially rectangular. In the illustration in FIG. 2, the radially acting elastomeric spring components 17 and 18, situated opposite one another, then, respectively, 19 and 20, likewise situated opposite one another, project into this opening, the cross section of which is identified by the reference numeral 24. Those ends of the radially acting elastomeric spring components 17, 18, 19 and 20 which project into the opening have been designed with rounded regions 22, each of which is a raised region delimiting the cross section 24 of the opening in the bearing unit 1. The mounting of the radially acting elastomeric spring components 17, 18, 19 and 20 with space between them, and the fact that the radially acting elastomeric spring components have no connection with one another ensure that in the event of deformation of the radially acting elastomeric spring components 17, 18, 19 and 20, using the space below the collar 8 of the support 9, any material from the radially acting elastomeric spring components 17, 18, 19 and 20 which deforms during any deformation has sufficient free space available into which the material can escape.

The support 9, controlled so as to be substantially circular, is designed with abutment surfaces 15 and 16. The reference numeral 10 indicates the upper centering collar with which the support 9 is designed. The outer circumference of the support 9 of the elastomeric spring components 3, 13, 17, 18, 19 and 20 is identified by reference numeral 23. As is apparent from the illustration in FIG. 2, it is fully possible for the radially acting elastomeric spring components 17, 18, 19 and 20 to be designed with different curvature radii for their rounded regions 22. The opening 24, delimited within the bearing element 1 proposed according to the invention by the raised regions 21 of the radially acting elastomeric spring components 17, 18, 19 and 20, has an approximately trapezoidal profile. If use is made of radially acting elastomeric spring components with different rigidities, the radially acting elastomeric spring components 17 and 18 situated opposite one another can have a certain rigidity while the radially acting elastomeric spring components 19 and 20 shifted at 90° thereto and situated opposite one another can have rigidities different from those of the first-mentioned radially acting elastomeric spring components 17 and 18. This method can be used to set different characteristics, such as damping, spring travel and rigidity, at the circumference of the cross section 24 of the opening in the bearing unit 1, and these characteristics can be set and individually adapted by simple swapping of the radially acting elastomeric spring components 17, 18, 19 and 20 which have no connection with one another.

FIG. 3a shows a plan view of the support of the bearing unit proposed according to the invention.

The outer circumference of the support 9 is identified by reference numeral 23. The plan view of FIG. 3a shows the abutment surface 15 for an annular elastomeric spring 3 which can be inserted onto the support 9. The radially acting elastomeric spring components which determine the cross section 24 of the opening in the bearing unit 1 and are situated opposite one another, within the cross section 27 of the opening in the support 9, have been omitted. The raised region 8 of the support 9 which (cf FIG. 1) holds the radially acting elastomeric spring components is indicated by reference numeral 8. The plan view of FIG. 3a also shows the centering collar 10 which surrounds the cross section 27 of the opening in the support 9.

The illustration of FIG. 3b shows a diagrammatic perspective view of the support 9 of the bearing unit 1.

The support 9 comprises a lower end side 28 designed with the collar 8 and delimiting the centering collar 11 on the lower side of the support 9. In analogy with the illustration of FIG. 3a, the outer circumference of the support 9 is indicated by reference numeral 23. To improve recyclability, the support or support element 9 and, received thereon, the radially acting elastomeric spring components 17, 18, 19 and 20 and, respectively, the annular elastomeric spring components 3 and 13 which can be applied are composed of the same base material. Each of 15 and 16 indicates the abutment surfaces for the annular elastomeric spring components 3 and 13 which can be applied.

FIG. 3c shows a cross section through the support 9 of the bearing unit 1.

The section illustrated in FIG. 3c passes through the region 8 (cf. FIG. 3b) of the cross section 27 of the opening in the support 9. The support 9 is designed with a height indicated by reference numeral 25, and also has two end sides 28 and 29 situated opposite one another. The outer sides of the centering collars 10 and 11, which have thickened walls due to the course taken by the section through the support element 9, lie flush one on top of the other, while between the outer sides of the centering collars 10 and 11 there is an annular surrounding region 26, whose outer circumference is identified by reference numeral 23. As shown in FIG. 3b and in the illustration of FIG. 3a, the opening 27 extends through the interior of the support 9 as shown in FIG. 3c. In each of the illustrations of FIGS. 3a, 3b and 3c, the support 9 of the bearing unit 1 is illustrated in isolation, without the radially acting elastomeric spring components 17, 18, 19 and 20 provided in its interior, as shown in FIG. 2. The support 9 illustrated here of the bearing unit 1, and the elastomeric spring components 3 and 13 which can be applied, and also the radially acting elastomeric spring components 17, 18, 19 and 20 introduced in the interior of the support 9 and positioned opposite to one another, are preferably all composed of the same base material.

We claim:

1. A bearing unit (1) for receiving add-on parts and vehicle components on supporting parts of vehicles, where the bearing unit (1) comprises at least one elastically deformable elastomeric component (3, 13) which is supported on an outer abutment surface (14, 15) of a support (9) having at least one centering collar (10, 11), wherein the support (9) has received elastomeric spring components (17, 18, 19, 20) for various coordinate directions, not connected to one another, and wherein each of the elastomeric spring components (17, 18, 19, 20) are supported on an inner abutment (16) of the support (9) and are held by a collar (8) of the support (9).

2. A bearing unit as claimed in claim 1, wherein the elastomeric spring components (3, 13; 17, 18, 19, 20) have different rigidities.

3. A bearing unit as claimed in claim 1, wherein the elastomeric spring components (3, 13; 17, 18, 19, 20) have different hardnesses.

4. A bearing unit as claimed in claim 1, wherein the support (9) and the elastomeric spring components (3, 13; 17, 18, 19, 20) are composed of the same base material.

5. A bearing unit as claimed in claim 1, wherein the support (9) comprises a metal core on which the elastomeric spring components (3, 13) are inserted.

6. A bearing unit as claimed in claim 5, wherein the elastomeric spring components (3, 13) are bolted, screwed or adhesively bonded to the support (9).

7. A bearing unit as claimed in claim 1, wherein the elastomeric spring components (3, 13; 17, 18, 19, 20) have been foamed onto the support (9).

8. A bearing unit as claimed in claim 1, wherein abutment surfaces (14, 15, 16) for the elastomeric spring components (3, 13; 17, 18, 19, 20) have been formed on the support (9).

9. A bearing unit as claimed in claim 1, wherein the elastomeric spring components (17, 18, 19, 20) have been received with the support (9) in a manner which allows them to move relative to each other.

10. A bearing unit as claimed in claim 1, wherein gaps are provided between the elastomeric spring components (17, 18, 19, 20) and the support (9).

11. A bearing unit as claimed in claim 1, wherein the inner surface of the support defines a through-opening and the elastomeric spring components (17, 18, 19, 20) have been provided with a profile (21, 22) projecting into the through-opening in the bearing unit (1).

* * * * *